Aug. 29, 1944.  F. W. CURTIS  2,357,088
CUTTING TOOL
Filed Sept. 28, 1942
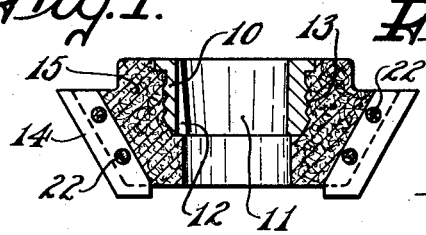
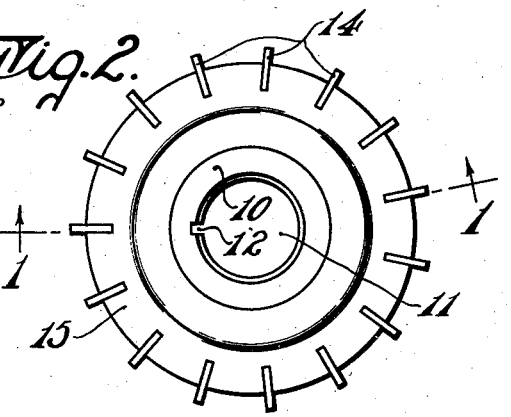
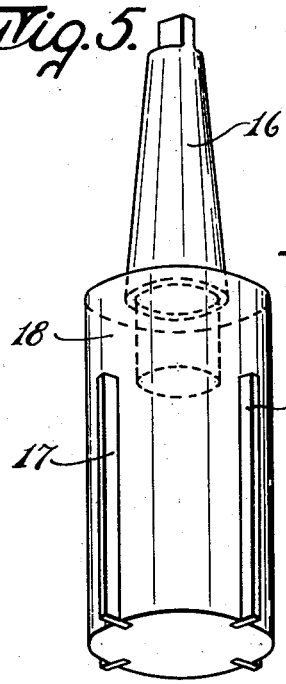
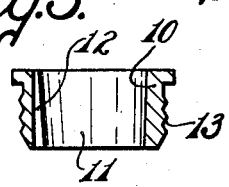
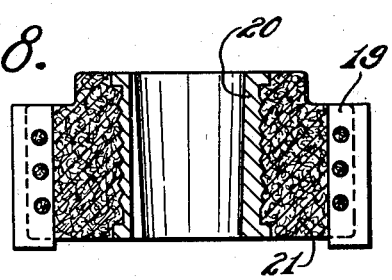
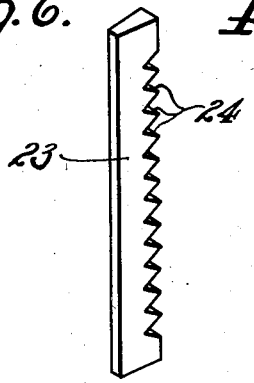
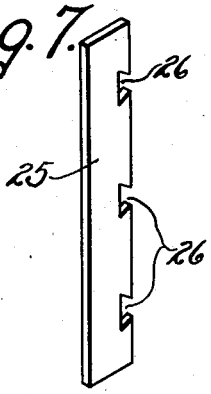
INVENTOR
FRANK W. CURTIS
BY
Chapin & Neal
ATTORNEYS Patented Aug. 29, 1944

2,357,088

UNITED STATES PATENT OFFICE 2,357,088

CUTTING TOOL

Frank W. Curtis, Springfield, Mass., assignor to Van Norman Company, a corporation of Massachusetts Application September 28, 1942, Serial No. 459,916

4 Claims. (Cl. 29—103)

This invention relates to cutters for machine tools, and has for its object the improvement of such tools both in lowered cost of manufacture and combined accuracy and long life in operation.

The customary way of making such cutting tools as milling cutters, reamers, and the like has been to machine them from a block of solid steel. A less common expedient has been to mold the blades into a matrix of metal of a low fusing point. In accordance with my present invention the separate blades are embedded in a matrix of an organic plastic having certain characteristics mentioned below. It has heretofore been observed that the life of milling cutters was greater when used on machines having hydraulic drives than when used on machines with purely mechanical drives. I belive this to be due to a certain resiliency in the oil, and that a similar effect can be obtained in an improved manner by incorporating a certain degree of resiliency into the cutter itself, since by this means the desired quality will be retained whether the tool be used on hydraulically or on mechanically driven milling machines.

In accordance with my invention I embed the cutting teeth of the tool in a matrix of an organic plastic having the desired qualities; and preferably provide means, preferably a metal sleeve or shank, by which the tool may be secured to the usual arbor or spindle. This plastic should be of the type having high impact strength as well as high tensile strength, the two qualities not necessarily being found in the same type of plastic.

One particular organic plastic which has the desired combination of qualities is the so-called shock resistant phenol-aldehyde resin. These shock resistant resins are made by combining a suitable filler with the resin itself, preferably a comminuted textile material such as chopped canvas. Such materials will have a tensile strength of about 7,000 to 8,000 pounds per square inch, a flexural strength of 10,000 to 13,000 pounds per square inch, and an impact strength of perhaps from 1 to 4 foot pounds per notch inch. The ethyl cellulose resins also have high toughness with a tensile strength of about 8,000 pounds per square inch, a flexural strength of about 9,000 pounds per square inch, and an impact strength of about 1 to 2 foot pounds per notch inch. There are also other resins having similar properties. It is preferred to employ an organic plastic having the combination of a flexural strength of over 10,000 pounds per square inch, a tensile strength of over 7,000 pounds per square inch, and an impact strength of over 1 pound per notch inch; although for tools where the strain is low one or more of these specifications may be lowered.

The invention will now be described in connection with the accompanying drawing, in which Fig. 1 is a sectional view through a milling cutter or facing tool constructed in accordance with the invention, taken on line 1—1 of Fig. 2;

Fig. 2 is a top plan view of the cutter shown in Fig. 1;

Fig. 3 is a detail of a sleeve used in the construction of Fig. 1;

Fig. 4 is a prospective detail of a cutter blade shown in Fig. 1;

Fig. 5 is a perspective view of a reamer constructed in accordance with the invention;

Fig. 6 is a perspective detail of a modified form of blade;

Fig. 7 is a similar detail of a further modification; and

Fig. 8 is a view of a milling cutter of a different form.

The milling cutter shown in Figs. 1 to 4 is composed of a sleeve 10 having a tapered hole 11 and a key-way 12 by which it may be secured to any desired spindle or arbor. The outer surface 13 of the sleeve is roughened by knurling or otherwise to give a good grip to the molded material. These knurlings may be replaced by undercut grooves if desired. The blades 14 can be made from any suitable material, such as steel of the nature used for hack-saw blades, and may be hardened and ground prior to or after molding. It is preferable to grind the cutting faces of the blades prior to molding to avoid machining, and to grind the peripheral surfaces, including any backing-off, after assembly and molding. Alternatively the molding may be completed and the hardening done substantially as described in my co-pending application for Patent Serial No. 469,659, filed December 19, 1942, now Patent No. 2,325,746, issued August 3, 1943. The blades will be mounted in a suitable mold to give out a suitable quantity of thermo-setting plastic of any suitable type as outlined above. The sleeve 10 is also placed in the mold and the assembly subjected to heat and pressure, the heat of setting the material being sufficiently low so that no drawing of the temper of the blades will occur. In the completed cutter the blades will be bonded to the sleeve 10 through the intervening of a body 15 having the slightly resilient quality referred to above.

The same construction may be adapted for tools of other types such for example as the reamer shown in Fig. 5. This has the usual tapered shank 16 and blades 17 secured together by a molded body of organic plastic 18. It will be clear that by treating the blades and giving them suitable cross-sectional form the same invention may be employed in taps. In Fig. 8 has been shown a milling cutter of the usual type constructed in general in accordance with Fig. 1, the blades 19 being secured to an inner sleeve 20 by means of a molded body of plastic 21.

It is obvious that various methods of increasing the grip of the molded plastic on the blades may be used. In Fig. 4 the blade is provided with holes 22 through which the plastic flows during molding to produce a riveting action. A somewhat similar effect can be produced in the blades 23 shown in Fig. 6 by making them wedge shaped in cross section, the wide piece of the wedge being embedded in the plastic, the inner end of the blades preferably being serrated as shown to prevent longitudinal movement. An alternative form is shown in Fig. 7 where the blades 25 are provided with dove-tailed slots 26 into which the plastic will flow to anchor the blade against both lateral and longitudinal movement.

The blades may be hardened throughout or the hardened area may be confined to the cutting edge, leaving the body of the blade unhardened to increase the toughness and resiliency of the blade as a whole, one way in which this effect may be brought about being disclosed in my copending application referred to.

What I claim is:

1. A cutting tool comprising a plurality of cutting blades, a carrying sleeve, a body of organic plastic joining the blades to the sleeve, said organic plastic having the properties of a flexural strength above 10,000 pounds per square inch, a tensile strength above 7,000 pounds per square inch, and an impact strength in excess of 1 pound per notch inch.

2. A cutting tool comprising a plurality of cutting blades, a carrying sleeve, and a body of organic plastic joining the blades to the sleeve, said organic plastic comprising a phenol formaldehyde resin combined with comminuted textile material.

3. A milling cutter comprising a sleeve, having its interior formed to receive an arbor, a series of blades located around the sleeve but spaced therefrom, and a body of organic plastic connecting the sleeve and the blades, said blades being formed to interfit with the plastic and prevent relative movement therebetween.

4. A milling cutter comprising a sleeve, having its interior formed to receive an arbor, a series of blades located around the sleeve but spaced therefrom, a body of organic plastic connecting the sleeve and the blades, said blades being formed to interfit with the plastic and prevent relative movement therebetween, said organic plastic having the properties of a flexural strength above 10,000 pounds per square inch, a tensile strength above 7,000 pounds per square inch, and an impact strength in excess of 1 pound per notch inch.

FRANK W. CURTIS.